United States Patent Office 3,188,989
Patented June 15, 1965

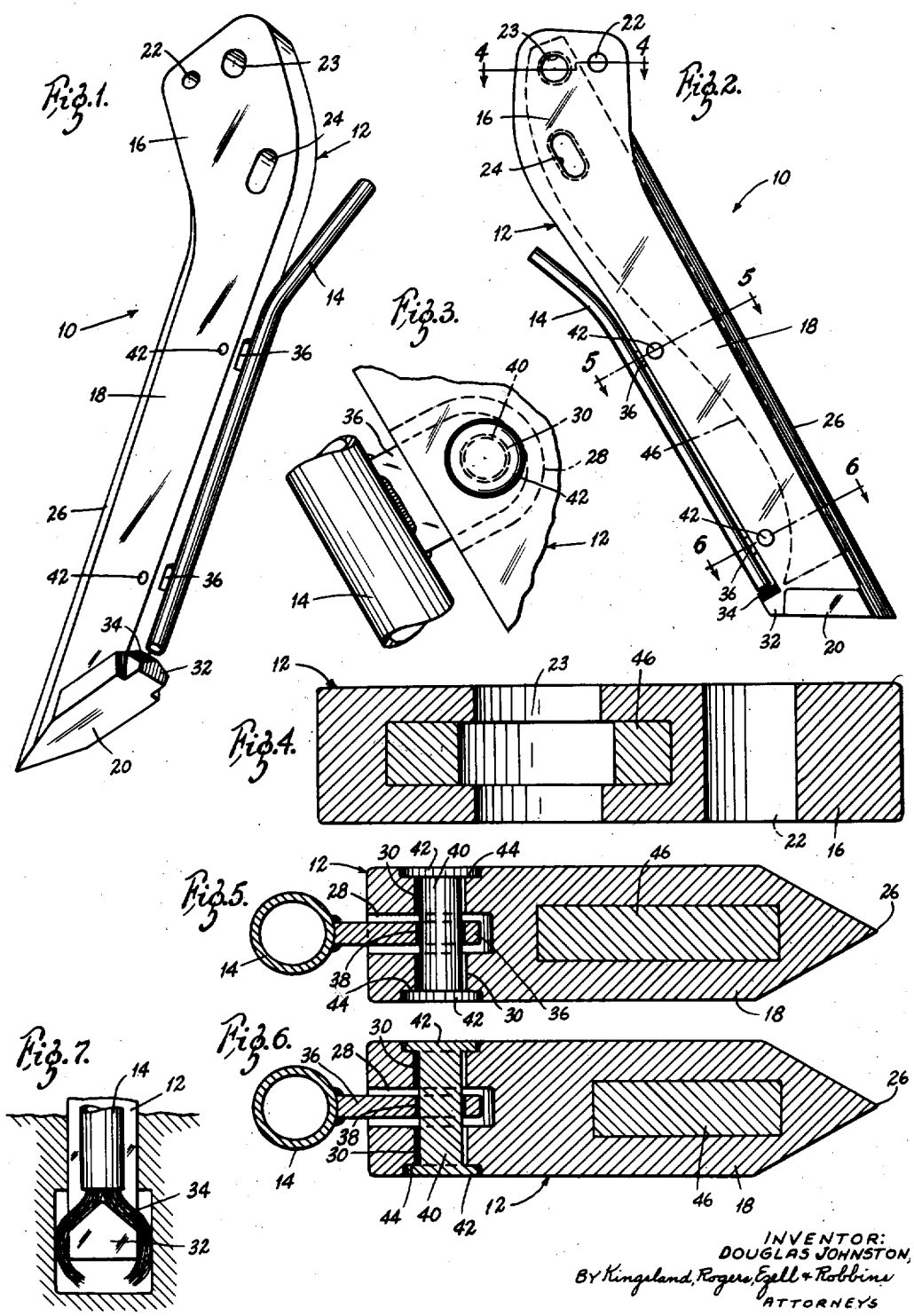

1

3,188,989
APPLICATOR KNIFE
Douglas Johnston, Athens, Ala., assignor to Decatur Foundry & Machine Co., Decatur, Ala., a partnership
Filed Apr. 8, 1963, Ser. No. 271,242
2 Claims. (Cl. 111—7)

The present invention relates generally to devices for sub-surface application of liquids, such as anhydrous ammonia and liquid fertilizer, into the soil, and more particularly to a novel applicator blade or knife structure for such purpose.

Heretofore, the conventional applicator blade or knife structure has consisted essentially of a rectangular steel forging, sharpened on the leading edge, and generally curving forwardly at the bottom in a manner to place the bottom or toe of the blade ahead of the top part, which is normally held by two flat plates receiving bolts securing the blade to a coil spring or rigid shank for movement into and through the ground. A steel tube, usually one-eighth inch steel pipe, is welded to the back of the blade, the tube being formed to fit the curve at the rear of the blade. Normally, the tube is closed at the bottom and a hole is drilled through each side to discharge liquids, such as anhydrous ammonia or fertilizer solution. The bottom of the tube is closed to prevent dirt from packing into the tube. In some constructions, the tube is inserted into a hole in the bottom of the blade and outlet holes are drilled in the latter. Serious disadvantages exist in the conventional structures. In swinging sideways in the ground, dirt often packs into the holes drilled in the side of the tube and between the tube and the blade, building up back pressure in the metering device and frequently causing inaccurate metering. The shanks of many applicator blades are not perfectly true and dispose the tube to one side, exposing it to abrasive action of the soil which quickly cuts the tube open. Tubes welded to the rear of the blade discharging anhydrous ammonia, a well-known refrigerant, often cause freezing of the blade resulting in ice formation which will increase the over-all width of the blade to such an extent that soil cannot close in behind it so that the released ammonia will not be sealed. Most of it will be lost due to vaporization.

Therefore, a main object of the present invention is to provide a novel applicator blade structure which overcomes the foregoing disadvantages present in conventional structures.

In brief, the present novel applicator blade structure includes a blade generally rectangular in form and having the leading edge sharpened to facilitate movement through the ground. A foot portion is provided incorporating a heel having a top sharpened to an angle of approximately ninety degrees. A tube is removably pivotally connected to the rear of the shank portion of the blade in position for discharge onto the top of the heel.

Hence, another object of the present invention is to provide a novel applicator blade structure which includes a tube for liquids pivotally associated with the shank of the blade in a manner to insure a continuous trailing of the shank by the tube to avoid abrasive action of the soil.

Another object is to provide a novel applicator blade structure which is constructed to permit removal, repair and replacement of the tube or blade, or removal of a damaged tube and replacement with another in the field with the use of readily accessible, simple parts and tools carried with farm machinery.

Another object is to provide a novel applicator blade structure which is constructed for continuous operation with minimum soil damage to the tube and with minimum obstruction to the deposit of liquids, as required.

Another object is to provide a novel applicator blade structure which is of rugged construction and is adapted to give long-trouble-free use in the subsoil deposit of liquids.

The foregoing and other objects and advantages are apparent from the following description taken with the accompanying drawing, in which:

FIGURE 1 is a side perspective view of an applicator blade structure incorporating the features of the present invention;

FIGURE 2 is a side elevational view thereof;

FIGURE 3 is an enlarged, fragmentary side elevational view showing details of the pivotal connection of the tube with the shank of the blade;

FIGURE 4 is an enlarged, transverse, cross-sectional view taken on substantially the line 4—4 of FIGURE 2;

FIGURE 5 is an enlarged, transverse, cross-sectional view taken on substantially the line 5—5 of FIGURE 2;

FIGURE 6 is an enlarged, transverse, cross-sectional view taken on substantially the line 6—6 of FIGURE 2; and FIGURE 7 is a diagrammatic view illustrating the flow of liquid from the tube and over the pointed top portion of the heel and into the soil.

Referring to the drawing more particularly by reference numerals, 10 indicates generally an applicator blade structure made in accordance with the teachings of the present invention. Broadly, the applicator blade structure 10 includes a blade or knife 12 and a tube 14 pivotally mounted thereon.

The blade or knife 12 is of the configuration clearly shown in the drawing and includes a mounting portion 16, a shank portion 18, and a foot portion 20. In the mounting portion 16 are suitable apertures 22, 23 and 24 to accommodate mounting upon machines of various makes. The front of the shank portion 18 and the foot portion 20 are shaped to provide a sharp leading edge 26, as is clearly illustrated in FIGURES 1, 2, 5 and 6. In the rear of the shank portion 18 are spaced slots 28, aligned apertures 30 extending through the opposite walls of each.

The foot portion 20 of the blade 12 is formed as clearly shown in the drawing and includes a heel part 32 having a sharpened top 34 formed as a reverse V at an angle of about 90°.

The tube 14 preferably is of stainless steel, comprising a predetermined length of one-eighth inch steel tubing. Spaced ears or tabs 36 are welded to the tube 14 for insertion in the slots 28, each tab 36 including an aperture 38 therethrough. As is clear from FIGURES 3, 5 and 6, a rivet 40 extends through each opposed pair of openings 30 and through the opening 38 of the tab 36 disposed in the slot 28, opposed heads 42 of said rivet 40 being peened over in conventional manner and being inset against annular shoulders 44. It will be noted that there is a substantial play both in the fit of the opening 38 about each associated rivet 40 and the thickness of the tab 36 and the width of the slot 28, so that the tube 14 can pivot freely. The tube 14 is open at the bottom and discharges directly onto the top 34 of the heel part 32 in a manner diagrammatically shown in FIGURE 7.

The tube 14 is readily detachable from the blade 12 simply by driving out the rivets 40. Hence, when the blade 12, wears to a point rendering it substantially useless, the tube 14 may be removed and applied to a new blade 12. Similarly, a new tube 14 may be attached to a still usable blade 12 should damage occur to the tube 14. The tube 14 can be readily removed in the field by driving out the rivets 40 and replacing them with two sixteen-penny nails after repair or substitution has been accomplished, which will satisfactorily maintain the parts in pivotal relation until the day's work is done. The pivotal relationship of the tube 14 and the shank portion 18 permits the former to trail the latter at all times so that the tube 14 is always protected against the abrasive action of the soil.

As is pointed out above and as is clearly shown in the drawing, the tube 14 discharges directly onto the top 34 of the heel part 32 of the foot portion 20, which effectively disperses the liquid and which establishes a protective relationship for the open, lower end of the tube 14.

It should also be noted that the pivotal mounting of the tube 14 is effective in preventing permanent lodging of dirt between the tube 14 and the shank portion 18, since the relative movement therebetween will dislodge any dirt which may temporarily become caught between the tube 14 and the shank portion 18. Furthermore, the mounting of the tube 14 through the tabs 36 reduces the conductive means between the tube 14 and the shank portion 18 to a minimum, so that the subzero liquids in the tube 14 will not cause ice formations on the shank portion 18, which does occur when the parts are welded together.

A further advantage of the hinged tube 14 is that this single conduit may be removed by punching out the rivets 40 and a double tube mounted behind the blade portion 18 in place thereof. It is sometimes desired to apply both anhydrous ammonia and phosphoric acid, for example, at the same time, which can be accomplished with two parallel tubes. The removability of the tube 14 also contributes to use of stainless steel as a material thereof, since, as has been pointed out above, the tube 14 can be salvaged when the blade 12 is worn out.

The blade 12, of course, can be made through several processes. As illustrated, the blade 12 includes a tough alloy steel core 46 and a glass-hard point and surface for maximum wear resistance.

It is apparent that there has been provided a novel applicator blade structure which fulfills the objects and advantages sought therefor.

It is to be understood that the foregoing description and the accompanying drawing have been given by way of illustrations and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, an applicator blade structure for subsurface application into the soil of liquids, the elements of the structure comprising a leading blade and a trailing materials dispensing tube, and at least two vertically spaced mounting means for mounting the elements together with said tube on and at the rear of said leading blade for subsurface dispensing, each mounting means comprising a tab on one of the elements, a hole through the tab, a slot in the other element, the slots being larger than the tabs to loosely receive the tabs, and each mounting means further including a pin fixed to the said other element and extending through the hole in the tab, the holes in the tabs being larger than the diameters of the pins, the aforesaid mounting means providing substantial play in the fit of the holes around the pins and the fit of the tabs within the slots to enable the tube to pivot freely relative to the blade.

2. The combination of claim 1 in which said leading blade includes a rearwardly extending heel part, said heel part being formed in its upper surface as an inverted V, said inverted V-surface being disposed beneath and close to the lower end of said dispensing tube, thereby dispersing the dispensed materials and protecting the open lower end of the tube from foreign matter.

References Cited by the Examiner
UNITED STATES PATENTS

| | | | |
|---|---|---|---|
| 2,646,012 | 7/53 | Ingalls | 111—7 |
| 2,768,591 | 10/56 | James | 111—7 |
| 2,853,030 | 9/58 | Dugan | 111—7 |
| 2,903,982 | 9/59 | Floy | 111—7 |
| 2,988,026 | 6/61 | Heckathorn | 111—7 |

FOREIGN PATENTS

| | | |
|---|---|---|
| 200,637 | 1/56 | Australia. |
| 51,721 | 5/36 | Denmark. |
| 335,464 | 9/21 | Germany. |

ABRAHAM G. STONE, *Primary Examiner.*

T. GRAHAM CRAVER, WILLIAM A. SMITH,
*Examiners.*